Figure 1:
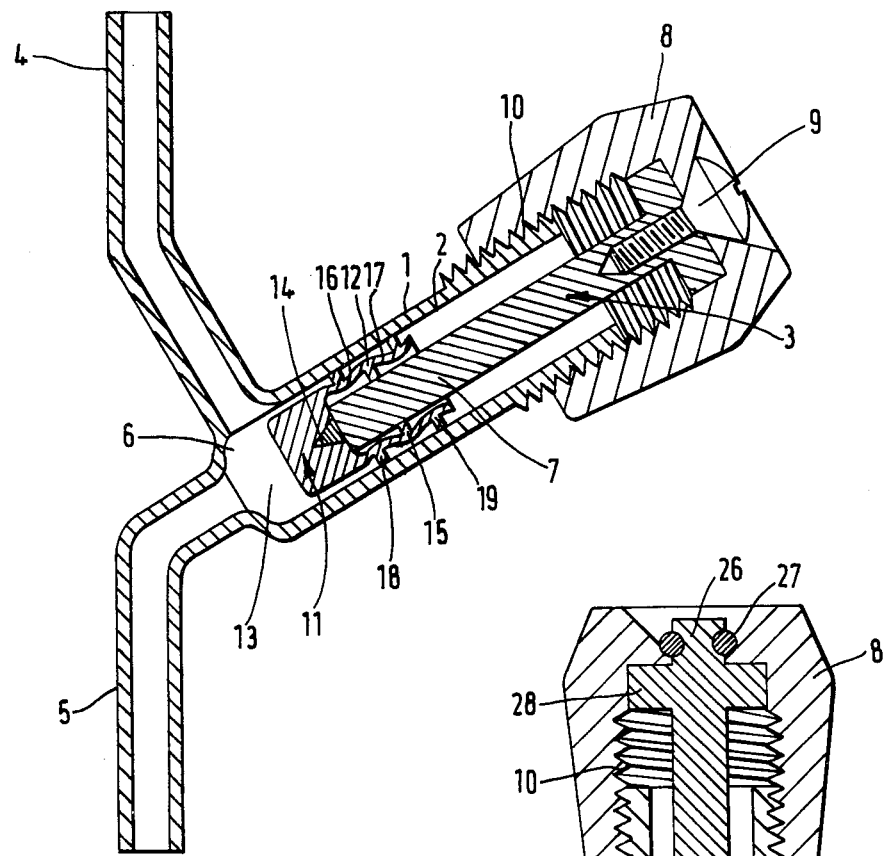

United States Patent [19]

Nightingale

[11] 4,183,500
[45] Jan. 15, 1980

[54] CONTROL VALVES

[75] Inventor: Douglas D. J. Nightingale, St. Albans, England

[73] Assignee: Imperial Chemical Industries Limited, London, England

[21] Appl. No.: 825,150

[22] Filed: Aug. 16, 1977

[30] Foreign Application Priority Data

May 9, 1977 [GB] United Kingdom ............... 19382/77
Jul. 18, 1977 [JP] Japan ................... 30053/77

[51] Int. Cl.² .............................................. F16K 1/04
[52] U.S. Cl. .................. 251/335 R; 251/324; 251/214
[58] Field of Search ...................... 251/335 R, 63, 324, 251/368, 214, 215, 335 B, 331, 335 A; 137/625.47; 277/165, 214

[56] References Cited

U.S. PATENT DOCUMENTS

| 2,173,529 | 9/1939 | Beecher | 251/335 A |
|---|---|---|---|
| 2,645,238 | 7/1953 | Thornbery | 251/331 |
| 2,743,738 | 5/1956 | Johnson | 251/335 B |
| 3,062,496 | 11/1962 | Stehlin | 251/324 |
| 3,117,595 | 1/1964 | Broecker et al. | 251/335 R |
| 3,144,042 | 8/1964 | Glauber | 251/335 R |
| 3,184,216 | 5/1965 | Lovell | 251/335 R |
| 3,315,696 | 4/1967 | Hunter | 251/63 |
| 3,443,589 | 5/1969 | Benedetti | 251/331 |
| 3,484,084 | 12/1969 | Simpson et al. | 251/215 |
| 3,528,087 | 9/1970 | Perkins | 251/335 B |
| 3,688,798 | 9/1972 | Nightingale et al. | 137/625.47 |
| 3,747,479 | 7/1973 | Nightingale et al. | 251/368 |
| 3,904,174 | 9/1975 | Giese | 251/335 A |
| 3,985,155 | 10/1976 | Nightingale et al. | 251/324 |
| 3,993,099 | 11/1976 | Nightingale | 251/324 |

FOREIGN PATENT DOCUMENTS

| 1201141 | 7/1956 | Fed. Rep. of Germany | 251/335 |
|---|---|---|---|
| 1120223 | 9/1956 | Fed. Rep. of Germany | 251/335 |
| 2432028 | 1/1975 | Fed. Rep. of Germany | 251/214 |
| 78213 | 5/1962 | France . | |
| 1482916 | 4/1967 | France | 251/335 |
| 924710 | 5/1963 | United Kingdom | 251/215 |

*Primary Examiner*—William R. Cline
*Assistant Examiner*—H. Jay Spiegel
*Attorney, Agent, or Firm*—Cushman, Darby & Cushman

[57] ABSTRACT

In a valve for controlling fluid flow, the spindle comprises a flexible polymeric sheath, preferably PTFE, around the end of a stem, the sheath having a tubular portion suspended clear of the stem and having an oversize external ridge which is accommodated within the bore by flexing of the tubular portion, resistance to this flexing serving to bias the external ridge against the surrounding body to provide a gland seal.

17 Claims, 6 Drawing Figures

CONTROL VALVES

The invention relates to valves for controlling fluid flow, for example in laboratory equipment.

According to the invention there is provided a valve for controlling fluid flow comprising a hollow body having a smooth-surfaced bore and a flow passage for the fluid, and a spindle movable along the bore to occlude the flow passage during operation of the valve; the spindle comprising a stem enclosed at one end by a sheath of polymeric material attached to the stem so that movement of the stem along the bore effects corresponding movement of the sheath; the sheath comprising a tubular side wall extending from a closed end portion, at least one tubular portion of the side wall being flexible and being suspended clear of the stem to permit said tubular portion to flex radially inwards towards the stem, the tubular portion having means defining at least one integral annular ridge extending from its external surface to meet the surface of the bore, the ridge being oversize with respect to the bore and being accommodated within the bore by inward flexing of the tubular portion, so that resistance to this flexing serves to bias the ridge against the bore surface to provide a seal against loss of fluid from the valve.

The tubular portion of the sheath may be supported at the closed end of the sheath only, with the annular ridge located at or towards the open end of the sheath. However, it is generally preferred to support both ends of the tubular portion and to provide the annular ridge intermediate those ends. Means for supporting the tubular portion include the closed end of the sheath thickened into a solid block, one or more internal ridges extending inwards from the sheath to meet the stem, or one or more ridges or otherwise thickened portions of the stem extending outwards to meet the sheath. When the tubular portion is supported on both sides of its external annular ridge, the ridge is preferably half-way between adjacent supports; but this is not essential provided it is displaced from both supports so as to permit the underlying part of the tubular portion to flex inwards.

It is preferred that the sheath be constructed with the external annular ridge oversize with respect to the bore when the sheath is in an unstressed condition. Insertion into the bore then causes inward flexing of the tubular portion to provide the sealing bias. Alternatively, where the natural unstressed diameter of the ridge is equal to or less than the diameter of the bore, the tubular portion can be stretched outwards by internal supports at either end such that the annular ridge thereby becomes oversize with respect to the bore. Insertion into the bore then causes inward flexing of the tubular portion as above. This latter configuration also makes possible the introduction of the unstressed sheath into the bore, the tubular portion then being radially stretched in situ, e.g. by insertion of a smooth stem which is oversize to two internal annular ridges on the sheath. The two configurations may also be used in combination where appropriate.

The closed end of the sheath is preferably shaped to engage a valve seat in the body so as to occlude the flow passage when the valve is in a closed condition. An alternative is to provide the sheath with a further external sealing ridge which moves across the mouth of a radial port during closure or opening of the valve. Any such ridge may be provided with a sealing bias in essentially the same way as the gland seal ridges, by displacing it from the closed end of the sheath, for example.

The preferred material for construction of the sheath is polytetrafluoroethylene (PTFE). Even though it is well known that this material tends to creep under stress rather than provide a resilient flexibility, it was found to give good seals even when deriving all the sealing bias from its own resilience, and moreover there appeared to be no noticeable deterioration of the seal with time. Having discovered that PTFE was surprisingly effective in that respect, it enabled advantage to be taken of the general inertness and low friction for which it is renowned.

The invention is illustrated by reference to specific embodiments described hereinafter by way of example and shown in the accompanying drawings.

Figure 2:
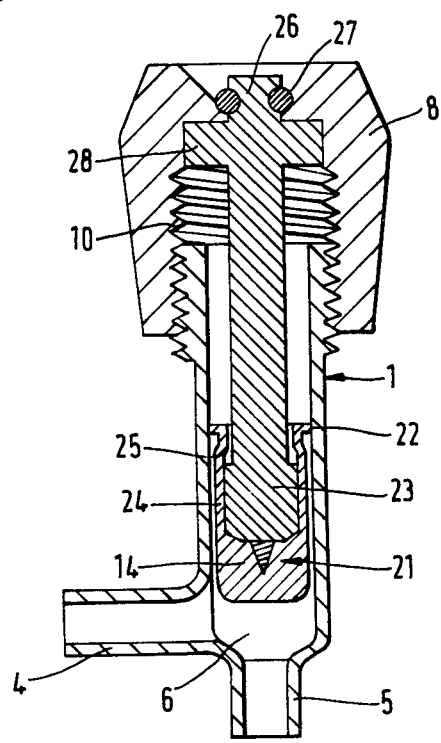
Figure 3:
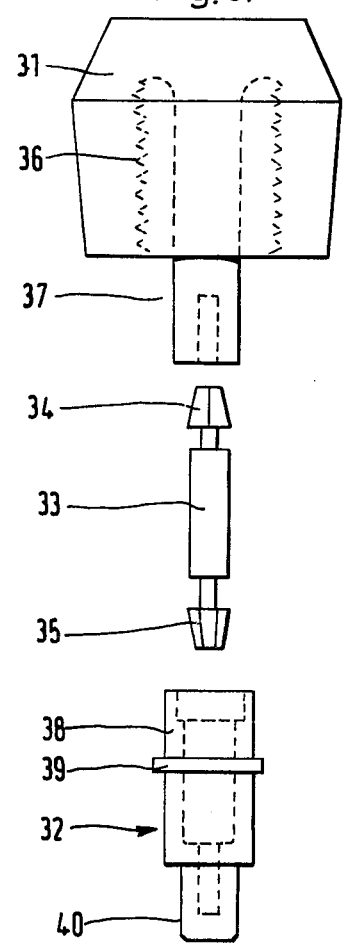
Figure 4:
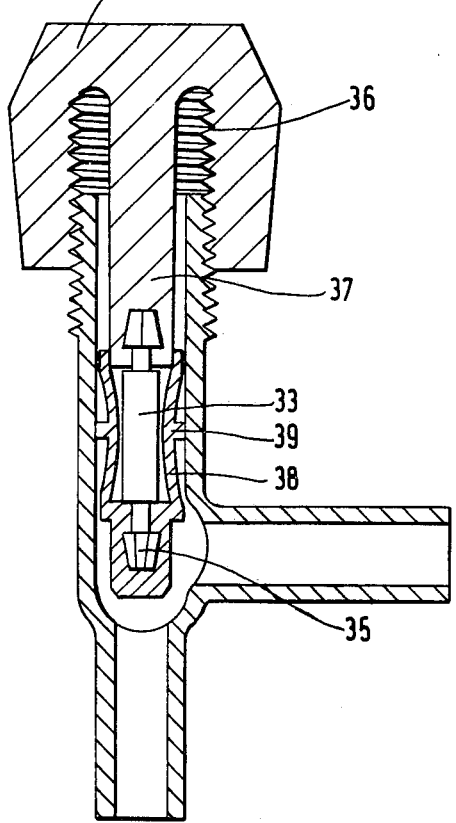
Figure 4:
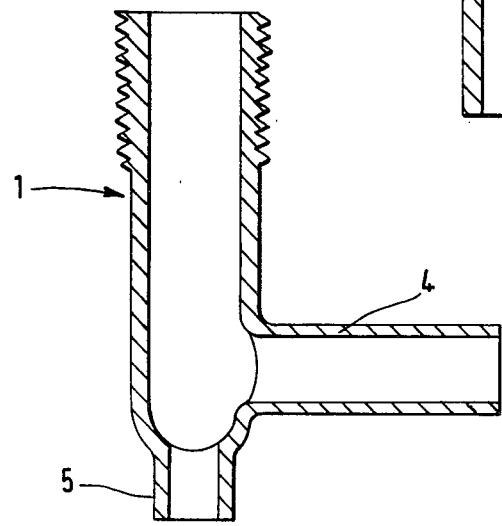
Figure 5:
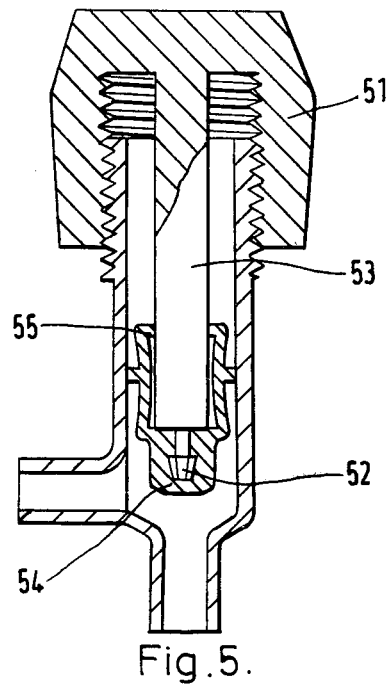
Figure 6:
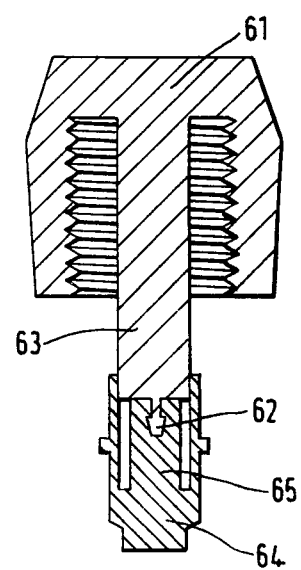

In the drawings:

FIG. 1 is a section through a laboratory stopcock,

FIG. 2 is a section through a similar stopcock in which the sheath and stem of the spindle, and the means for securing the cap, all differ from those of FIG. 1, FIG. 3 is an exploded view of a further stopcock, FIG. 4 is a section through the stopcock shown exploded in FIG. 3, FIG. 5 is a section through another stopcock in which the spindle is a simplified version of that shown in FIGS. 3 and 4, and FIG. 6 is a section through a stopcock spindle which is an alternative simplified version of that shown in FIGS. 3 and 4.

The stopcock shown in FIG. 1 comprises a hollow body 1 having a bore 2 within which is a spindle 3. The body has two arms 4, 5 communicating with the bore, one of the arms 5 leaving axially from the end of the bore where the body is shaped to provide a valve seat 6. The spindle comprises a stem 7 and a cap 8 secured to the stem by a screw 9. The open ends of the valve body and the cap are correspondingly screw-threaded 10.

At the end of the stem remote from the cap is a PTFE sheath 11, having a tubular side wall 12 and a massive closed end portion 13. The sheath is retained on the end of the stem by a screw 14. On the interior surface of the side wall is an annular ridge 15 which effectively divides the side wall into two flexible tubular portions 16, 17 of similar length, suspended clear of the stem. The portion 16 adjacent the closed end is supported at both ends, i.e. by the closed end and by the internal ridge 15 engaging the stem whereas the portion 17 adjacent the open end of the sheath is supported at one end only, i.e. by the internal ridge 15. Both portions of the side wall have means defining a single annular ridge 18, 19 on their external surfaces, extending to meet the surface of the bore. Both the internal ridge 15 and the two external ridges 18, 19 are oversize with respect to the gaps between the side wall and the stem, and the side wall and the bore respectively, so that in the assembled valve as shown in the drawing, the side wall is flexed inwards by the two external ridges and flexed outwards by the internal ridge. The PTFE of the sheath resists being flexed in this way, and its resistance to flexing serves to bias the two external ridges against the bore wall, and provide a gland seal.

The end of the stem is shown chamfered. This is to assist assembly by guiding the stem through the reduced clearance of the interior ring 15.

The valve is operated by rotating the cap with respect to the body. This has the effect of moving the spindle along the bore, due to the screw threads 10. The valve is closed by rotating the cap until the massive nose engages the valve seat and occludes the flow passage from one arm 4 to the other 5. Reversed rotation then opens the valve.

The valve shown in FIG. 2 has a body 1 and cap 8 which are essentially the same as those shown in FIG. 1. However the sheath 21 is different in having a side wall with no internal ridges and only one external ridge 22. The stem is also different from that of FIG. 1 in having an enlarged end portion 23 whose diameter is substantially the same as the internal diameter of the sheath. The length of this end portion of the stem is less than the length of the side wall of the sheath, and this divides the side wall into a supported portion 24 adjacent its closed end, and a flexible tubular portion 25 which is suspended clear of the stem, and carries the single external annular ridge 22. This ridge is oversize with respect to the bore so that on assembly the flexible tubular portion 25 flexes inwards, and resistance to such flexing biases the ridge against the bore to provide a gland seal.

In FIG. 2 the cap is attached in a different manner from that of FIG. 1. The end 26 of the stem is extended and provided with an annular groove in which is located an O-ring 27. The O-ring is fitted after the cap has been placed over the end of the spindle, past the groove, and up against an enlargement 28 of the stem, the O-ring preventing withdrawal of the stem from the cap. By suitably shaping the enlargement 28 and the part of the cap with which it engages, the cap may be made free to rotate on the end of the stem or be secured such that rotation of the cap ensures corresponding rotation of the spindle, as desired. The latter is generally preferred as this gives more positive adjustment during operation, but it is not essential provided that the longitudinal motion of the cap is transmitted to the stem.

Similarly, it is not essential to transmit rotational movement from the stem to the sheath (provided that movement along the bore is transmitted), although it is generally easier to attach the sheath rigidly to the stem, e.g. as shown in the drawings, and by avoiding relative motion between the sheath and the stem, wear on the internal ridges may be avoided.

The valve shown in FIGS. 3 and 4 uses a body 1 which is essentially the same as that of the previous drawings, but a different spindle. The spindle consists of a cap 31, a sheath 32 and a connecting member 33. The cap may be moulded from a relatively soft plastics material such as a polyolefin, the sheath is preferably formed from PTFE, and the connecting member may be turned from metal, e.g. brass, or moulded from a stiffer plastics material, e.g. a glass-filled material. The connecting member has a tapered crown 34, 35 at each end. The cap is generally mushroom shape with an outer portion internally threaded 36 and surrounding a hollow projecting neck 37. The sheath has a cylindrical side wall 38 with a single annular ridge 39 on its external surface. At the closed end is a hollow nose 40 whose external diameter is reduced in comparison with the side wall. There are three different internal diameters, the nose having the smallest internal diameter, this being substantially the same as that of the neck 37 of the cap. The side wall has a constant intermediate internal diameter over most of its length, but at the open end this is increased to the external diameter of the cap's neck 37.

To assemble the cap, the two crowns 34, 35 of the connecting member are inserted into the hollow portions of cap's neck 37 and sheath's nose 40, which are slightly smaller than the maximum diameters of the crowns. These are then pressed together so that the crowns are completely within those hollow portions, and the open ends of those hollow portions can snap back behind the crowns to prevent withdrawal. The nose of the sheath has a reduced external diameter so as to avoid any risk of the crown expanding the nose into the side arm of the body and locking the valve.

In this valve, the stem of the spindle is provided mainly by the connecting member, and the flexible tubular portion of the side wall carrying the ridge 40 is suspended clear or the connecting member, being supported at one end by the massive nose, and at the other end by the end of the cap's neck 37. Operation of the valve is essentially the same as that described for the previous drawings.

In FIGS. 5 and 6 the construction of a valve like that of FIGS. 3 and 4 is simplified by eliminating the connecting member. In both of these, the cap 51, 61 is moulded from a harder plastics material, e.g. a glass-filled thermoplastics composition. In both of these a crown 52, 62 is formed on the end of the neck 53, 63 of each cap, and this is pressed directly into a hollow portion provided for it in the sheath. In FIG. 5, the neck 53 extends to the nose 54 of the sheath, thus providing the stem of the spindle. The side wall is held clear of this stem by the closed end of the sheath, and by an annular internal ridge 55 at the open end. In FIG. 6 the closed end 64 of the sheath has an inner portion 65 extending towards the open end of the sheath, and forming at least part of the stem. The side wall 66 is suspended clear of the inner portion 65, being supported by the closed end 64 at one end, and by the end of the cap's neck 63 at the other end. FIG. 6 has been included to illustrate how the stem can be formed as an integral part of the sheath, but in practice the construction shown in FIG. 5 is generally the stronger, and hence is generally preferred.

I claim:

1. A valve for controlling fluid flow comprising a hollow body having a smooth-surfaced bore and a flow passage for the fluid, and a spindle movable along the bore to occlude the flow passage during operation of the valve; the spindle comprising a stem enclosed at one end by a sheath of polymeric material attached to the stem so that movement of the stem along the bore effects corresponding movement of the sheath; the sheath comprising a tubular side wall extending from a closed end portion, at least one tubular portion of the side wall being flexible and being suspended clear of the stem to permit said tubular portion to flex radially inwards towards the stem, the tubular portion having means defining at least one integral annular ridge extending from its external surface to meet the surface of the bore, said ridge being substantially transverse to said tubular portion and bore, the ridge being oversize with respect to the bore and being accommodated within the bore by inward flexing of the tubular portion, so that resistance to this flexing along serves to bias the ridge against the bore surface to provide a seal against loss of fluid from the valve.

2. A valve according to claim 1 in which the tubular portion is supported at both ends with the annular ridge on the external surface being intermediate those ends so as to be displaced from all means supporting said tubular portion.

3. A valve according to claim 1 wherein the annular ridge on the external surface of the sheath is oversize with respect to the bore when the sheath is in an unstressed condition.

4. A valve according to claim 1 wherein the valve body has a seat within the flow passage through the valve, and wherein the closed end of the sheath is shaped to engage said seat so as to occlude the flow passage when the valve is in a closed condition.

5. A valve according to claim 1 wherein the sheath is constructed from polytetrafluoroethylene.

6. A valve according to claim 1 wherein said means defining said at least one oversize integral annular ridge is oriented with respect to said flow passage so that flexing action of the tubular portion, rather than any valved fluid pressure, effects sealing of the bore surface against loss of fluid from the valve.

7. A valve for controlling fluid flow comprising a hollow body having a smooth-surfaced bore and a flow passage for the fluid, and a spindle movable along the bore to occlude the flow passage during operation of the valve, the spindle comprising a stem enclosed at one end by a sheath of polymeric material attached to the stem so that movement of the stem along the bore effects corresponding movement of the sheath; the sheath comprising a resiliently flexible tubular portion having a closed end and an open end, the tubular portion having an internal diameter greater than the diameter of the stem and being supported only at its closed end so that its open end is free to flex radially inwards towards the stem; and means defining at least one integral annular ridge encircling the tubular portion adjacent its open end, the ridge extending substantially transverse to said tubular portion and being of substantially constant thickness, and being oversize with respect to the bore and being accommodated within the bore by inward flexing of the open end of the tubular portion towards the stem, so that resistance to this flexing alone serves to bias the ridge against the bore surface to provide a seal against loss of fluid from the valve.

8. A valve according to claim 7 in which the spindle sheath has only a single annular ridge encircling the tubular portion adjacent its open end.

9. A valve according to claim 7 in which the closed end of the sheath is shaped to engage a valve seat in the body so as to occlude the flow passage when the valve is in a closed condition.

10. A valve according to claim 7 in which the sheath is constructed from polytetrafluoroethylene.

11. A valve for controlling fluid flow comprising a hollow body having a smooth-surfaced bore and a flow passage for the fluid, and a spindle movable along the bore to occlude the flow passage during operation of the valve, the spindle comprising a stem enclosed at one end by a sheath of polymeric material attached to the stem so that movement of the stem along the bore effects corresponding movement of the sheath, the sheath comprising a closed end portion and a tubular side wall extending from the end portion to encircle the end of the stem, the side wall having at least one resiliently flexible tubular portion which is of larger internal diameter than the diameter of the stem and which is supported at both ends only so that intermediate its ends it is free to flex radially inwards towards the stem; and the tubular portion having intermediate its two supported ends at least one integral annular ridge extending from its external surface to meet the surface of the bore, the ridge being oversize with respect to the bore and being accommodated within the bore by inward flexing of the tubular portion, so that resistance to this flexing alone serves to bias the ridge against the bore surface to provide a seal against loss of fluid from the valve.

12. A valve according to claim 11 in which the spindle sheath has only a single annular sealing ridge extending from the external surface of each of its one or more tubular portions.

13. A valve according to claim 12 in which the sealing ridge is mid-way between the two supported ends of the tubular portion.

14. A valve according to claim 11 in which the annular sealing ridge is oversize with respect to the bore when the sheath is in an unstressed condition, whereby insertion of the spindle into the bore during assembly of the valve causes the inward flexing of the tubular portion.

15. A valve according to claim 11 in which the closed end of the sheath is shaped to engage a valve seat in the body so as to occlude the flow passage when the valve is in a closed condition.

16. A valve according to claim 11 in which the sheath is constructed from polytetrafluoroethylene.

17. A valve according to claim 11 wherein said integral annular ridge of said tubular portion is substantially transverse to said tubular portion and to said bore, and is of substantially constant thickness.

* * * * *

UNITED STATES PATENT OFFICE
CERTIFICATE OF CORRECTION

Patent No. 4183500      Dated January 15, 1980

Inventor(s) Douglas Daniel John Nightingale

It is certified that error appears in the above-identified patent and that said Letters Patent are hereby corrected as shown below:

In the patent heading, under "foreign application priority date", "[JP] Japan" should be --[GB] United Kingdom--.

Column 4, line 57, "along" should read --alone--.

Signed and Sealed this

Twenty-fourth Day of March 1981

[SEAL]

Attest:

RENE D. TEGTMEYER

Attesting Officer     Acting Commissioner of Patents and Trademarks